United States Patent Office 2,994,822
Patented Aug. 1, 1961

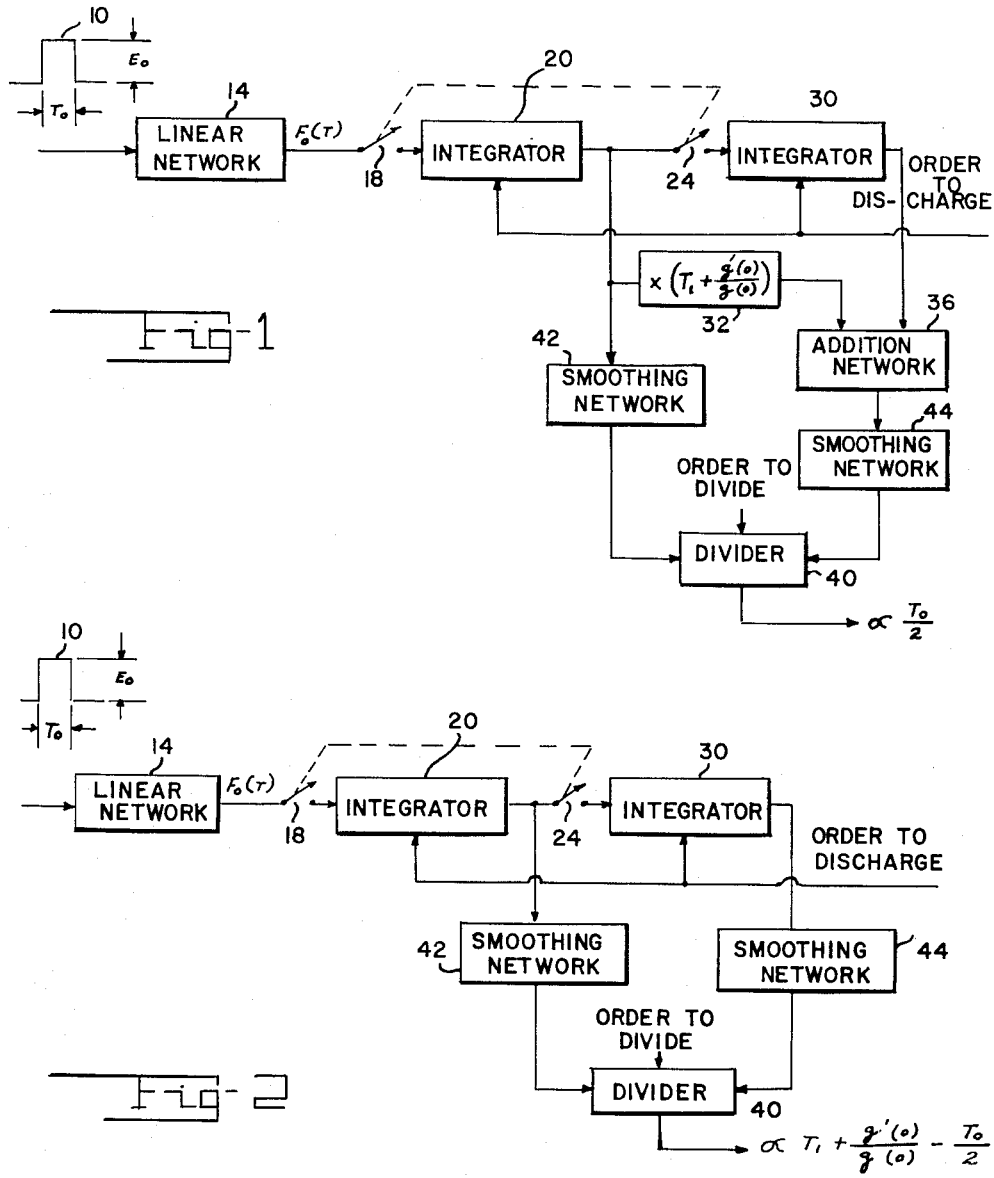

2,994,822
TECHNIQUE FOR THE DETERMINATION OF THE WIDTH OF A RECTANGULAR PULSE
Cary T. Isley, Jr., Palos Verdes Estates, Calif., assignor to the United States of America as represented by the Secretary of the Air Force
Filed May 11, 1960, Ser. No. 28,505
6 Claims. (Cl. 324—68)

The present invention relates to a method and a device for determining the duration of a rectangular electrical pulse.

The present methods of measurement of pulse widths are reasonable approximations only where effective signal-to-noise ratios are quite high, especially for narrow pulses. It is, however, difficult to distinguish signals of different pulse widths, even excluding noise difficulties, when all such pulse widths are less than the reciprocal of the receiver bandwidth.

The novel method and device minimize some limitations existing in prior art devices and, in addition, offer the advantage of relatively precise measurement of pulse width, thus effecting more significance in pulse width as an aid in data reduction and radar typing. The method and device are based on the use of the zero and first-order time moments of an output video pulse to yield accurate information regarding the width of an original input rectangular pulse regardless of the frequency response characteristics of the receiver.

It is an object of the invention to provide a method and device for precisely determining the duration of rectangular electrical pulses.

It is a further object of the invention to provide a method of precisely determining the duration of rectangular electrical pulses based on the use of zero and first-order time moments, regardless of the frequency response characteristics of the receiver.

It is a still further object of the invention to provide a pulse width analyser device for precisely measuring the pulse widths of rectangular electrical pulses regardless of the frequency response characteristics of the receiver.

Other objects, novel features and advantages of this invention will become apparent on consideration of the embodiments illustrated in the accompanying drawings and hereinafter described.

In the drawings:
FIGURE 1 is a schematic diagram of an embodiment of the novel pulse analyser device, and
FIGURE 2 is a schematic diagram of a modified version of the novel pulse width analyser device.

The technique for the determination of the width $T_0$ of a rectangular pulse is based on the use of the zero and first-order time moments. A signal applied to the receiver is a carrier modulated by a rectangular pulse of width $T_0$. The intermediate frequency response of the receiver is symmetrical and the second detector is a linear rectifier type detector. The signal may be considered, under such conditions, a rectangular pulse of width $T_0$ driving a network having a frequency transfer characteristic the same as the intermediate frequency amplifier translated from the intermediate center frequency to zero frequency. The linear network is defined as having a transfer function $g(s)$ whose poles all lie in the left-hand plane. Defining the time existence of the pulse between $0 < t < T_0$, then the functions:

$$M_0(T_1) = \int_0^{T_1} F_0(t)\,dt$$

$$M_1(T_1) = \int_0^{T_1} tF_0(t)\,dt$$

may be said to be the zero-order and first-order time moments of $F_0(t)$, respectively, where $F_0(t)$ is the video output of the receiver, and $T_1$ is the period of integration and such that:

$$\int_{T_1}^{\infty} |F_0(t)|\,dt < |\epsilon| \to 0$$

$$\int_{T_1}^{\infty} |tF_0(t)|\,dt < |\delta| \to 0$$

If the foregoing conditions are satisfied, then the following relations hold:

$$M_0(T_1) \to g(0)\,E_0\,T_0$$

$$M_1(T_1) \to g(0)\frac{E_0\,T_0^2}{2} - g'(0)\,E_0\,T_0$$

where:

$$g(0) = g(s)\Big|_{s=0}$$

$$g'(0) = \frac{dg(s)}{ds}\Big|_{s=0}$$

and $E_0$ is the amplitude of the input pulse.

The ratio of $M_1(T_1)$ to $M_0(T_1)$ is seen to approach:

$$\frac{M_1(T_1)}{M_0(T_1)} \to \frac{T_0}{2} - \frac{g'(0)}{g(0)}$$

This ratio yields a result proportional to the width of the original pulse plus a constant determined by the zero frequency characteristics of the linear network producing the arbitrary frequency distortion.

The first time moment may be expressed as:

$$M_1(T_1) = \int_0^{T_1} tF_0(t)\,dt = T_1\int_0^{T_1} F_0(t)\,dt - \int_0^{T_1}\int_0^{t} F_0(\tau)\,d\tau\,dt$$

Hence:

$$\frac{M_1(T_1)}{M_0(T_1)} = T_1 - \frac{\int_0^{T_1}\int_0^{t} F_0(\tau)\,d\tau\,dt}{\int_0^{T_1} F_0(t)\,dt}$$

From this relationship the puse width may be established to within a constant by the ratio of the double integral to the single integral of the function $F_0(t)$ over the interval from $t=0$ to $t=T_1$.

The technique may be instrumented by the device schematically diagramed in FIGURE 1 in the drawing. A rectangular pulse 10 of width $T_0$ and arbitrary amplitude $E_0$ is subjected to an arbitrary frequency distortion by a linear network 14. The function $F_0(t)$ is applied through switch 18 to a first integrator 20 whose output in turn is applied to the second integrator 30 through switch 24. Switches 18 and 24 are normally open until a video pulse appears. Both switches close at the instance of a pulse for the integration period $T_1$. After this period the switches again open and the outputs of integrators 20 and 30 are then respectively:

$$\int_0^{T_1} F_0(t)\,dt$$

and $$\int_0^{T_1}\int_0^{t} F_0(\tau)\,d\tau\,dt$$

The division process may be carried out by either of two systems. The system illustrated in FIGURE 1 applies the output of the first integrator 20 through multiplier 32 to addition network 36 where it is added to the output of the second integrator 30. The output of addition network 36, which is the dividend input to divider 40, is made up of the properly weighted outputs of integrators 20 and 30 such that no correction need be made in the output of the divider 40. The weighting is accomplished by multiplying the integrator 20 output by the quantity $$T_1 + \frac{g'(0)}{g(0)}$$

by means of multiplier 32. The output of the addition network 36 is approximately:

$$\left(T_1 + \frac{g'(0)}{g(0)}\right)\int_0^{T_1} F_0(t)\,dt - \int_0^{T_1}\int_0^t F_0(\tau)\,d\tau\,dt$$

The output of integrator 20 is applied to the divider 40 as the divisor. The divider output then is proportional to $$\frac{T_0}{2}$$

Another possible system is, as illustrated in FIGURE 2, to dispense with multiplier 32 and addition network 36, and apply the output of the second integrator as the dividend directly to the divider 40. The output of the integrator 20 is also applied directly to the divider 40. In this system a correction must be made in the output of the divider for the quantity $$T_1 + \frac{g'(0)}{g(0)}$$

in the divider output in order to obtain $$\frac{T_0}{2}$$

In many practical applications when handling continuous pulse trains, it is of advantage to employ averaging techniques. The division process, in such cases, is not executed or ordered until a smoothed average based on successive samples has been obtained of the results of each of the integrator outputs. The averaging is accomplished by smoothing networks 42 and 44 provided between the integrators and the inputs to the divider 40. Before analysis on the next pulse in the train may be accomplished, it is necessary to restore the integrators to their original state by an order to discharge.

These techniques can be applied to the measurement of pulse width of pulsed R.F. carriers providing the receiver passband is centered on the signal carrier and possesses amplitude and phase symmetry about the carrier frequency. The equivalent transfer function $g(s)$ is established by translating one side (of symmetry) of the receiver transfer function from the carrier to zero frequency.

The invention is not limited to the examples of embodiments shown and described, but may on the contrary, be capable of many modifications without departing from the spirit of the invention.

I claim:

1. A pulse width analyser device for determining the duration of a rectangular pulse after passage through a frequency distortion producing network comprising: a first integrator having its input coupled to the output of said network, a second integrator having its input coupled to the output of said first integrator, and means having its inputs coupled to the outputs of the said first integrator and said second integrator for dividing the output of said second integrator by the output of said first integrator.

2. A pulse width analyser device for determining the duration of a rectangular pulse after passage through a frequency distortion producing network comprising: a first integrator having its input coupled to the output of said network, a second integrator having its input coupled to the output of said first integrator, means for multiplying pulses by a weighting factor, an addition network having its inputs coupled to the outputs of said first integrator through said multiplying means and said second integrator, and means having its input coupled to the outputs of the said first integrator and said addition network for dividing the output of said addition network by said output of said first integrator.

3. A pulse width analyser device for determining the width of rectangular pulses in a continuous pulse train after passage through a frequency distortion producing network comprising: a first integrator having its input coupled to the output of said network, a second integrator having its input coupled to the output of said first integrator, means for multiplying pulses by a weighting factor, an addition network having its inputs coupled to the outputs of said first integrator through said multiplying means and said second integrator, means for smoothing a train of waveforms to obtain an average waveform, and means having its inputs coupled through said means for smoothing to the outputs of the said first integrator and said addition network for dividing the smoothed output of said addition network by the smoothed output of said first integrator.

4. A pulse width analyser device for determining the width of rectangular pulses in a continuous pulse train after passage through a frequency distortion producing network comprising: a first integrator having its input coupled to the output of said network, a second integrator having its input coupled to the output of said first integrator, means for multiplying pulses by a weighting factor, an addition network having its inputs coupled to the outputs of said first integrator through said multiplying means and said second integrator, means having its inputs coupled to the outputs of the said first integrator and said addition network for dividing the output of said addition network by said output of said first integrator, a pair of smoothing networks in the input circuit of said dividing means for obtaining smoothed averaged pulse inputs to said dividing means, and means for discharging the first and second integrators.

5. The method of determining the duration of a rectangular pulse after passage through a frequency distortion producing network comprising: integrating the distorted pulse to produce the zero-order time moment of the said distorted pulse, integrating said zero-order time moment to produce the first-order time moment of the said rectangular pulse plus a constant which is proportional to said zero-order time moment in magnitude, multiplying the output of the first integrator by a weighting factor of magnitude and sign such that no correction need be made in the output of the dividing step, adding the outputs of the second integrator and the weighted first integrator, and dividing the sum of the adding step by the integrated distorted pulse, whereby the resultant quotient is proportional to the width of said rectangular pulse.

6. The method of determining the width of rectangular pulses in a continuous pulse train after passage through a frequency distortion producing network comprising: integrating the distorted pulses to produce the zero-order time moment of the said distorted pulses, integrating said zero-order time moment to produce the first-order time moment of the said rectangular pulses plus a constant which is proportional to said zero-order time moment in magnitude, multiplying the output of the first integrator by a weighting factor of magnitude and sign such that no correction need be made in the output of the dividing step, adding the outputs of the second integrator and the weighted first integrator, smoothing the integrated frequency distorted pulses for obtaining an average integrated pulse, smoothing the sum of the adding step for obtaining an average pulse, and dividing the smoothed sum of the adding step by the smoothed integrated distorted pulse, whereby the resultant quotient is proportional to the width of said rectangular pulse.

References Cited in the file of this patent

UNITED STATES PATENTS

| | | |
|---|---|---|
| 2,552,013 | Orpin | May 8, 1951 |
| 2,716,215 | Flarity | Aug. 23, 1955 |